(12) United States Patent
Teduka et al.

(10) Patent No.: US 9,248,455 B2
(45) Date of Patent: Feb. 2, 2016

(54) FILTER MELTING METHOD FOR SEPARATING MIXTURES

(75) Inventors: Masahiro Teduka, Sapporo (JP); Masaharu Jo, Sapporo (JP)

(73) Assignees: KABUSHIKIKAISHA JO, Hokkaido (JP); HOKKAIDO RESEARCH ORGANIZATION, Hokkaido (JP)

( * ) Notice: Subject to any disclaimer, the term of this patent is extended or adjusted under 35 U.S.C. 154(b) by 1328 days.

(21) Appl. No.: 12/896,448

(22) Filed: Oct. 1, 2010

(65) Prior Publication Data

US 2011/0079044 A1 Apr. 7, 2011

Related U.S. Application Data

(63) Continuation-in-part of application No. PCT/JP2009/057042, filed on Mar. 31, 2009, and a continuation-in-part of application No. PCT/JP2009/067452, filed on Sep. 30, 2009.

(30) Foreign Application Priority Data

Apr. 4, 2008 (JP) ................................. 2008-120011
Feb. 2, 2009 (JP) ................................. 2009-041440

(51) Int. Cl.
*B01D 9/04* (2006.01)
*B04B 3/00* (2006.01)
*B04B 15/10* (2006.01)
*B01D 17/00* (2006.01)
*B04B 7/18* (2006.01)
*B01D 9/00* (2006.01)

(52) U.S. Cl.
CPC . *B04B 3/00* (2013.01); *B01D 9/004* (2013.01); *B01D 17/08* (2013.01); *B04B 7/18* (2013.01); *B04B 15/10* (2013.01)

(58) Field of Classification Search
None
See application file for complete search history.

(56) References Cited

U.S. PATENT DOCUMENTS

| | | | | | |
|---|---|---|---|---|---|
| 2,007,546 | A | * | 7/1935 | Petty | 208/35 |
| 2,769,852 | A | * | 11/1956 | Paulson | 585/814 |
| 2,780,663 | A | * | 2/1957 | Gunness | 585/812 |
| 2,815,364 | A | * | 12/1957 | Green | 560/78 |
| 2,816,938 | A | * | 12/1957 | Hess | 585/812 |
| 2,855,100 | A | * | 10/1958 | Findlay | 210/769 |
| 2,874,199 | A | * | 2/1959 | Tarr | 62/538 |
| 2,891,099 | A | * | 6/1959 | Skinner | 62/539 |

(Continued)

FOREIGN PATENT DOCUMENTS

| | | |
|---|---|---|
| JP | 51-014585 B1 | 5/1976 |
| JP | 52-074960 A | 6/1977 |

(Continued)

OTHER PUBLICATIONS

Dehydrator—460VS (Saito Separator Limited, Japan) (2007).
Frytherm; "The Scraped surface heat exchanger—efficient heating and cooling", Company Frymakoruma, Neuenburg. Germany); Romaco AG 2005.
Furukawa et al.; "Morphological Instability on an Ice Disk"; J. Jpn. Soc. Microgravity Appl., vol. 21, No. 3, (2004), pp. 217-223.
Wiegandt, Herbert et al.; "Saline Water Conversion by Freezing"; Advance in Chemistry Series No. 27, pp. 82-89, (1960).

(Continued)

*Primary Examiner* — Robert James Popovics
(74) *Attorney, Agent, or Firm* — Westerman, Hattori, Daniels & Adrian, LLP

(57) ABSTRACT

The present invention provides a method and apparatus using a meltable filter medium for separating a mixture to be separated (liquid-solid or liquid-liquid mixture). The mixture to be separated is separated into a liquid passing through a filter layer of the filter medium and a captured material captured in the filter layer. The filter medium and the captured material are separated by melting the filter medium.

1 Claim, 9 Drawing Sheets

(56) References Cited

U.S. PATENT DOCUMENTS

| | | | | |
|---|---|---|---|---|
| 2,910,363 | A | * | 10/1959 | Rubin et al. .................. 426/417 |
| 2,931,841 | A | * | 4/1960 | De Vault .......................... 62/542 |
| 2,945,903 | A | * | 7/1960 | Findlay ............................ 62/540 |
| 3,171,727 | A | * | 3/1965 | Brown et al. .................... 62/535 |
| 3,183,679 | A | * | 5/1965 | Mohlman et al. ............... 62/535 |
| 3,198,607 | A | * | 8/1965 | Green ............................. 422/106 |
| 3,218,817 | A | * | 11/1965 | Tooke ............................. 62/534 |
| 3,222,881 | A | * | 12/1965 | Moon et al. ..................... 62/539 |
| 3,233,420 | A | * | 2/1966 | Vesper ............................ 62/540 |
| 3,314,243 | A | * | 4/1967 | McKay ............................ 62/540 |
| 3,320,153 | A | | 5/1967 | Pino |
| 3,339,372 | A | * | 9/1967 | Cottle .............................. 62/541 |
| 3,395,547 | A | * | 8/1968 | Stoller .............................. 62/538 |
| 3,403,029 | A | * | 9/1968 | Malick ............................ 426/384 |
| 3,487,652 | A | * | 1/1970 | McKay ............................ 62/541 |
| 3,541,804 | A | * | 11/1970 | Wiegandt et al. ............... 62/536 |
| 3,653,929 | A | | 4/1972 | Dwyer |
| 3,845,230 | A | | 10/1974 | Dwyer, Jr. |
| 3,916,018 | A | * | 10/1975 | Edison et al. .................. 585/816 |
| 4,335,001 | A | | 6/1982 | Aurelle et al. |
| 4,497,184 | A | | 2/1985 | Utter et al. |
| 4,734,102 | A | * | 3/1988 | Thijssen et al. ................. 23/296 |
| 4,735,781 | A | * | 4/1988 | Thijssen et al. ............... 422/251 |
| 4,749,394 | A | * | 6/1988 | Ehrsam ........................... 62/532 |
| 4,810,274 | A | * | 3/1989 | Cheng et al. .................... 62/637 |
| 4,956,520 | A | * | 9/1990 | Flett et al. ..................... 585/815 |
| 5,060,483 | A | * | 10/1991 | Heiland ................... C02F 1/22 210/354 |
| 5,250,192 | A | * | 10/1993 | Martel, Jr. ...................... 210/737 |
| 5,394,706 | A | * | 3/1995 | Keus ................................ 62/123 |
| 5,470,473 | A | * | 11/1995 | Park ..................... B01D 33/073 210/402 |
| 5,589,079 | A | * | 12/1996 | Park ..................... B01D 33/073 210/391 |
| 5,676,847 | A | * | 10/1997 | Yamamoto et al. ........... 210/784 |
| 6,076,364 | A | * | 6/2000 | Stripp ........................ B63J 1/00 62/123 |
| 6,237,346 | B1 | | 5/2001 | Ogoshi et al. |
| 6,500,347 | B2 | * | 12/2002 | Ohkoshi ............... B01D 33/09 210/391 |
| 7,168,571 | B2 | | 1/2007 | Gerteis et al. |
| 7,812,206 | B2 | * | 10/2010 | Wilsak ..................... B01D 9/00 210/767 |
| 8,211,319 | B2 | * | 7/2012 | Wilsak ..................... B01D 9/00 210/767 |
| 8,956,542 | B1 | * | 2/2015 | Wakayama ............... C02F 1/22 210/198.1 |
| 8,962,906 | B2 | * | 2/2015 | Wilsak ..................... B01D 9/00 210/767 |
| 2005/0056599 | A1 | * | 3/2005 | Wilsak et al. .................. 210/767 |
| 2007/0225539 | A1 | * | 9/2007 | Wilsak ..................... B01D 9/00 585/812 |
| 2009/0018347 | A1 | * | 1/2009 | Heilek ................. B01D 9/0013 548/555 |
| 2009/0149562 | A1 | * | 6/2009 | Nordhoff ................ C07C 51/42 521/149 |
| 2011/0044877 | A1 | * | 2/2011 | Turenne ................ C01B 33/037 423/350 |
| 2011/0079044 | A1 | * | 4/2011 | Teduka et al. .................... 62/544 |
| 2011/0124834 | A1 | * | 5/2011 | Heilek ................... C07C 51/43 526/317.1 |
| 2011/0146030 | A1 | * | 6/2011 | Huisjes .................. B01D 9/004 23/299 |
| 2012/0118835 | A1 | * | 5/2012 | Huisjes et al. ................. 210/807 |
| 2012/0260850 | A1 | * | 10/2012 | Turenne ................ C01B 33/037 117/81 |
| 2013/0287666 | A1 | * | 10/2013 | Verdoes ................ C01B 25/234 423/321.1 |
| 2014/0042108 | A1 | * | 2/2014 | Verdoes ............... B01D 9/0045 210/773 |
| 2014/0346126 | A1 | * | 11/2014 | Teduka .................. B01D 9/004 210/769 |

FOREIGN PATENT DOCUMENTS

| | | |
|---|---|---|
| JP | 59-109264 A | 6/1984 |
| JP | 62-250923 A | 10/1987 |
| JP | 6-226018 A | 8/1994 |
| JP | 9-038405 A | 2/1997 |
| JP | 2001-009218 A | 1/2001 |
| JP | 5422794 B2 | 2/2014 |

OTHER PUBLICATIONS

Hobbs, Peter V.; "Ice Physics", Clarendon Press Oxford, (1974), pp. 580-581.

"3M Fluorinert™ Liquids for Electronics Manufacturing", hydrofluoroether (inert-antifreezing Liquid) Dec. 2003, pp. 1-4. (From Wikipedia, the free encyclopedia (3M Fluorinert Electronic Liquid-Contains links to Material Safety Data Sheets and Product Information Sheets)).

Sambuichi, Masao et al.; "Theory of Batchwise Centrifugal Filtration", AIChE Journal, vol. 33, No. 1, Jan. 1987, pp. 109-120.

Seki, Mitsuo et al.; "Experimental Studies on Amount of Snowfall by Crystal Growth in an Artificial Snowfall Device", Trans. of the JSRAE, vol. 25, No. 4 (2008) pp. 325-335.

Perry, Robert H. et al.; Perry's Chemical Engineers' Handbook, 6th Ed. 1984, Section 15, 19, 21.

Thijssen, H.A.C.; "Freeze-concentration"; edited by A. Spicer, Applied Science Pub. Ltd., London UK, 1974, pp. 115-121, 130-132.

Zeitsch K. "Centrifugal Filtration", In Liquid-Solid Separation, 3rd Ed., Butterworths, London, pp. 509-530, (1990).

Extrusion Type—Basket-type centrifugal separator VP (Tanabe Willtec Inc Japan) (2009).

Okabe, Toyohiko; "On the Desalting Experiments by Freezing Process Employing Semi-Industrialized Scale Equipment in Japan", Dechema-Monographien, pp. 815-821, (1962).

Spielman, L.A. et al.; "Progress in Induced Coalescence and a New Theoretical Framework for Coalescence by Porous Media"; Industrial and Engineering Chemistry, vol. 61, No. 10, pp. 10-24, (1970).

Rege et al.; "A Network Model for Deep Bed Filtration of Solid Particles and Emulsion Drops"; AIChE Journal (Nov. 1988), vol. 34, No. 11, pp. 1761-1772.

Teduka, M. et al., "Ice-using Equipment that Separates Oil from Natural Materials", Industrial, Chemical Machinery & Safety Division Koenkai Koen Ronbunshu, May 23, 2008, pp. 9-10, No. 08-11. (with English Abstract).

Teduka, M. et al., "Koori Roka Sochi no Jitsuyoka Koori Roka Jitsuyo Sochi no Gutaika Sekkei ni Kansuru Kenkyu", Hokkaido Industrial Research Institute Seika Happyokai Program Happyo Yoshi, May 16, 2008, p. 42. (with English Abstract).

Teduka, M. et al., "Ice-Filter Equipment for Oil Separation from Natural Materials", Hokkaidoritsu Sogo Kenkyukikou Kyogyo Sikenjyo Houkoku, 2010, pp. 37-44, No. 309. (with English Abstract).

Teduka, M. et al., "Ice Filter Equipment for Oil Separation from Natural Materials", Kagaku Kogaku Ronbunshu, 2010, pp. 181-187, vol. 36, No. 3. (with English Abstract).

M. Tezuka et al. "Tennenbutsu kara no Abura Bunri no Tameno Koori o Mochiita Sochi", Industrial, Chemical Machinery & Safety Division Koenkai Koen Ronbunshu, vol. 2008, May 23, 2008, pp. 9-10, PCT/JP2009/067452, not enclosed.

M. Tezuka et al. "Koori Roka Sochi no Jitsuyoka Koori Roka Jitsuya Sochi no Gutaika Sekkei ni Kensuru Kenkyu", Hokkaido Industrial Research Institute Seika Happyokai Program Happyo Yoshi, vol. 2008, p. 42, PCT/JP2009/067452, not enclosed.

International Search Report of PCT/JP2009/067452, mailing date Feb. 2, 2010.

International Search Report of PCT/JP2009/057042, mailing date Jul. 14, 2009.

* cited by examiner

PRIOR ART (Disk Centrifuge)

FILTER MELTING METHOD FOR SEPARATING MIXTURES

TECHNICAL FIELD

The present invention relates to a technique for separating a liquid/liquid mixture or a liquid/solid mixture.

BACKGROUND ART

A technique for separating liquid/liquid mixtures and liquid/solid mixtures includes filtration (Perry Robert H. Perry's Chemical Engineers' Handbook, 6th ed., pp. 19.65-19.89, 1984) (this hand book is referred to as the "Perry document" hereinafter). In the filtration, a mixture to be separated (liquid-solid mixture or liquid-liquid mixture) is supplied to a filter layer made of, for example, a porous material (such as diatomaceous earth) or a fibrous material, and a liquid is passed through the filter layer due to differential pressure (such as centrifugal force) while solids are captured in the filter layer. Alternatively, a low-viscosity liquid is passed through the filter layer, while a high-viscosity liquid and/or solids are captured in the filter layer and separated. With respect to the low-viscosity liquid and the high-viscosity liquid, a liquid and a liquid immiscible therewith (hereinafter referred to as an "immiscible liquid") (a plurality of immiscible liquids may be included) in a liquid-liquid mixture are regarded as the low-viscosity liquid and the high-viscosity liquid, respectively, by a relative comparison of viscosities.

1. Filtration and Recovery of Captured Material

In the filtration, it is a difficult problem to improve recovery and a recovery rate (=recovery amount/capture amount) of substances captured in the filter layer. The filtration also includes separation by a membrane (such as ultra filtration membrane). Methods for improving the recovery rate of captured substances include a method using an organic solvent (such as hexane) (Perry, pp. 15 1-15 20). However, this method may cause deterioration of the captured substances. In addition, the solvent is generally recovered by an evaporation method, thereby increasing the cost of the method (a large quantity of heat energy is required for evaporating the solvent).

2. Meltable Filter Medium

It is considered that filter crystals described below can be used as a filter medium for capturing viscous liquid and/or solids. The filter crystals are the followings:

1) Fine crystals (which may be grains), needle/rod-like crystals, dendrite-like crystals, or flake/plate-like crystals produced in a liquid; crystals produced by removing or scraping crystals formed by contact between a cooled solid such as metal and a liquid; or crystals by grinding (such as impact grinding using rotation centrifugal force) or crystals by crushing after their formation.

2) Crystals produced by mixing liquid in gas by low-temperature evaporation, heating evaporation, spraying, or liquid dropping, forming crystals by contact between the resultant mixture and a cooled solid (such as metal) or a solid (such as plastic), and removing or scraping the crystals from the cooled solid or the solid.

3) A crystal group including the crystals described in 1) and/or 2).

The filter crystals are meltable single crystals and/or polycrystals. Possible substances for the filter crystals include materials such as ice. The above-mentioned 1), 2) and 3) are described in the following a) and b).

a) Formation of Filter Crystals in Liquid

It is known from documents below that filter crystals can be formed in liquid by rapid crystallization of single-components liquid or rapid crystallization of multi-component liquid.

With respect to formation of ice crystals from an aqueous solution, Thijssen, H. A. C., A. Spicer ed., Applied Science Pub. LTD., London UK, p. 117-121, 1974 (hereinafter referred to as the "Thijssen document") discloses the followings:

1. By unidirectional freezing, the ice grows in the form of needles or bars with an irregular cross section perpendicular to the cooled surface.

2. In a liquid, amounts of fine crystals increases (the occurrence rate of crystal nuclei (fine ice) increases) with increasing cooling rates or increasing solute concentrations.

3. Ice crystals increase in size over time.

With respect to freezing of water, Yoshinori F. and Etsuro Y., JASMA Vol. 21, 217-223 2004 discloses that an the amount of dendrite crystals increases with increasing cooling rate.

In addition, PETER V. HOBBS, CLARENDON PRESS OXFORD, pp. 580-581 1974 discloses that dendrite crystals are easily formed from an aqueous solution as compared with pure water.

Examples of materials other than water that can be used for the filter crystals of the present invention include materials such as clathrate hydrates (U.S. Pat. No. 6,237,346 B1).

U.S. Pat. No. 3,845,230 and U.S. Pat. No. 3,320,153 disclose techniques that form a ice-crystal layer from a mixture composed of a mixture to be separated and ice crystals. The U.S. Pat. No. 3,845,230 discloses a centrifugal method to form an ice-crystal layer using a rotating basket. Also it is described that spherical ice crystals are formed by extending a residence time during slow freezing and that fine ice crystals are produced by shortening the residence time during rapid freezing. The U.S. Pat. No. 3,320,153 relates to a technique for separating an oil and a mixture of ice crystals and solidified wax.

b) Formation of Filter Crystals in Gas

A type of formation of filter crystals in a gas includes natural snow.

Filter crystals can be artificially formed in gas as follows: A liquid is mixed in a gas by low-temperature evaporation, heating evaporation, spraying, or liquid dropping, and the resultant mixture is contacted with crystal-forming materials or cooled-crystal-forming materials to produce solidified materials (artificial snow) of the liquid.

3. Filtration

Documents explaining a filter layer and a fluid mixture to be passed through the filter layer according to the present invention are described below. According to these documents, the following matters are found. 1) A filtration is considered as a method capable of separating a liquid-liquid (a high-viscosity liquid and a low-viscosity liquid) mixture by capturing the high-viscosity liquid by a crystal-filter layer and passing the low-viscosity liquid through the crystal-filter layer. 2) A filtration has the function to coalesce immiscible droplets and/or fine solids.

3.1 Characteristics of Filtration a) Based on research of freeze concentration (separation between ice crystals and concentrate), the Thijssen document describes on pp. 130-132 the following. In a method for separating between ice crystals and a liquid (press, centrifugal filtration, and washing), a permeation rate of the liquid (filtrate amount per unit area and time) is inversely proportional to the viscosity of the liquid and the filter layer thickness (the distance for the liquid to pass) and is proportional to the square of the mean crystal diameter. The Thijssen document also describes that in centrifugal filtration of ice crystals and a liquid, the amount of a liquid remaining in the filter layer is proportional to the viscosity of the liquid, and that the amount of remaining liquid decreases with increasing centrifugal effect (G).

b) In regard to centrifugal filtration, Masao et al., AIChEJ, Vol. 33, pp. 109-120 1987 and Perry document pp. 19.96-19.103 describe the following: The permeation flow rate decreases as the viscosity of a liquid increases and the filter layer thickness (the distance for the liquid to pass) increases. In addition, the permeation flow rate increases with increasing centrifugal effect (G) and with increasing rotation time.

3.2 Coalescing Function of Filtration

In Spielman, L. A. and Goren, S. L., Ind. Eng. Chem., Vol. 62, No. 10, p. 10-24 (1970), U.S. Pat. No. 4,335,001, and S. D. Rege, H. S. Fogler, AIChE Vol. 34, pp. 1761-1772 1988, it is described that the filtration has the function to coalesce fine solids and/or immiscible droplets (such as emulsion) in a mixture to be separated.

In the document of Spielman, L. A. and Goren, it is also described that the larger solids and/or droplets (the larger aggregates), the more easily the solids and/or droplets are captured in a filter layer.

In the present invention, considering the coalescing function (facilitating subsequent separation) of the filter layer, the coalescing function may be used as pre-treatment for separation of the mixture to be separated regardless of the presence of capture in the filter layer.

The document of Spielman and Goren further describes that a difference in permeability occurs between a high-viscosity liquid and a low-viscosity liquid when a mixture of these liquids is passed through the filter layer.

SUMMARY OF INVENTION

The present invention provides a method and an apparatus using a meltable filter medium for separating a mixture to be separated (liquid-solid or liquid-liquid mixture). The mixture to be separated is separated into a liquid passing through a crystal-filter layer which is made of the meltable filter medium and a captured material captured in the crystal-filter layer.

The present invention relates to a method having advantages such as the followings:

1. The filter medium and the captured material are separated by melting the filter medium. Thus, the capturing material and the captured material are easily separated.

2. When a low-temperature material such as ice or snow is used as the filter medium, corruption and/or deterioration can be delayed in treatment of the mixture to be separated such as natural material.

3. In a preferred embodiment of the present invention, components with a small difference in specific gravity in a mixture to be separated can also be separated.

Typical examples of a method using the meltable filter medium of the present invention are described below.

A method according to the present invention is a method for separating a mixture to be separated including a) a step of forming filter crystals from a mother liquid, b) a step of forming a crystal-filter layer of the filter crystals and supplying a mixture to be separated to a surface of the formed crystal-filter layer to separate the mixture to be separated into a passing liquid passing through the crystal-filter layer and a crystal-filter-layer-supporting wall having holes, and a captured material captured in the crystal-filter layer, c) a step of melting the crystal-filter layer among the crystal-filter layer and the captured material captured in the crystal-filter layer, and d) a step of separating, by gravity settling, the melted crystal-filter layer and the captured material captured in the crystal-filter layer.

Another method according to the present invention is a method for separating a mixture to be separated including a) a step of forming mother liquid crystals from a mother liquid, b) a step of forming deliquored filter crystals by deliquoring the mother liquid crystals, c) a step of forming a crystal-filter layer of the deliquored filter crystals and supplying a mixture to be separated to a surface of the formed crystal-filter layer to separate the mixture to be separated into a passing liquid passing through the crystal-filter layer and a crystal-filter-layer-supporting wall having holes, and a captured material captured in the crystal-filter layer, d) a step of melting the crystal-filter layer among the crystal-filter layer and the captured material captured in the crystal-filter layer, and e) a step of separating, by gravity settling, the melted crystal-filter layer and the captured material captured in the crystal-filter layer.

BRIEF DESCRIPTION OF DRAWINGS

In FIG. 1, separation after melting a crystal-filter layer is performed by a gravity settling separation method for a liquid-liquid mixture. In addition, a case where a removed liquid and/or a melt produced in the gravity settling separation method are used as a mother liquid is shown by dotted lines.

In FIG. 2, separation after melting a crystal-filter layer is performed by a gravity settling separation method for a liquid-solid mixture. In addition, a case where a melt produced in the gravity settling separation method is reused as a mother liquid is shown by dotted lines.

FIG. 6 is a schematic sectional view showing an operation of a filter cloth inverting-type separator.

FIG. 8 shows conditions of holes of a crystal-filter-layer-supporting wall having holes.

DETAILED DESCRIPTION OF THE INVENTION

1. Outlines of apparatuses Outlines of apparatuses constituting a system are described.

Figure 1:
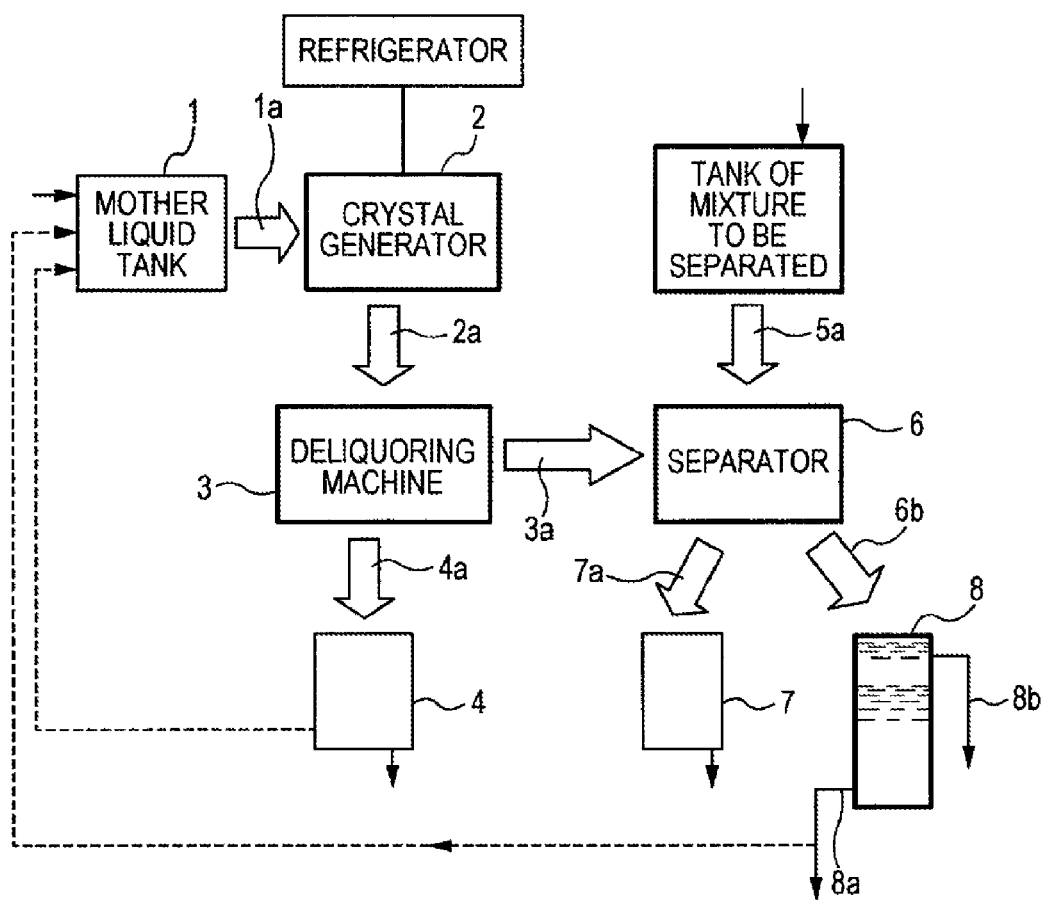
FIG. 1 shows a system including a crystal generator, a deliquoring machine, a separator, and a melting tank according to an embodiment of the present invention.
Figure 2:
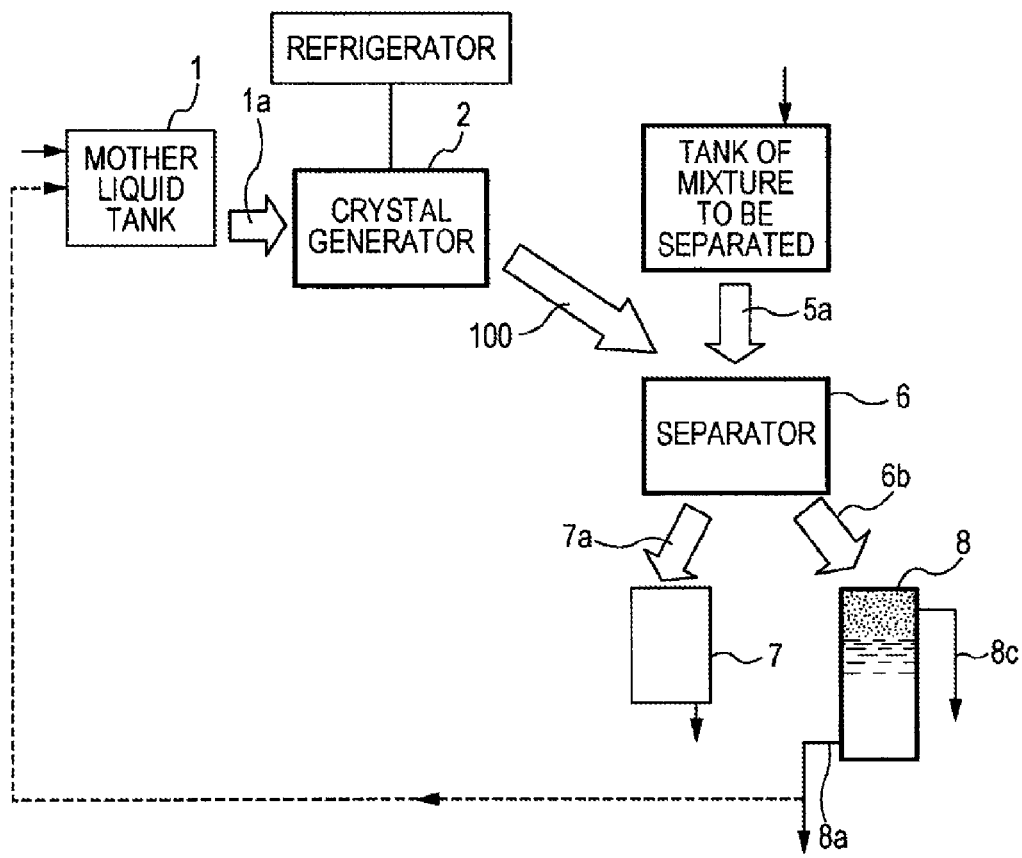
FIG. 2 shows a system including a crystal generator, a separator, and a melting tank according to an embodiment of the present invention.

FIGS. 1 and 2 show typical examples of a system for separating a mixture to be separated using a meltable filter medium. A system shown in FIG. 1 is a system including a crystal generator 2, a deliquoring machine 3, a separator 6, and a melting tank 8. A system shown in FIG. 2 is a system including a crystal generator 2, a separator 6, and a melting tank 8. In the present invention, such a system may be installed in a cooling environment such as a cooling room or chamber.

Each of the apparatuses constituting the systems is described below.

1) Crystal Generator 2

The crystal generator 2 is an apparatus for forming mother liquid crystals 2a. The crystal generator 2 produces the mother liquid crystals 2a by cooling a mother liquid 1a.

The mother liquid crystals 2a are crystals, a mixture of crystals and the mother liquid 1a, filter crystals 100, or a mixture of the filter crystals 100 and the mother liquid 1a. When the mother liquid 1a is a multi-component liquid, a liquid in the mixture has a solute concentration different from the mother liquid 1a.

The mother liquid crystals 2a are introduced to the deliquoring machine 3, the separator 6, or a deliquoring separator described below.

2) Deliquoring Machine 3

The deliquoring machine 3 is an apparatus that forms deliquored filter crystals 3a.

The mother-liquid crystals 2a from crystal generator 2 are deliquored by the movement of the liquid (the mother liquid) in the mother-liquid crystals 2a through a mother-liquid-crystals-supporting wall having holes (such as a basket- or drum-like wall, a filter cloth, or a screen) in the deliquoring machine 3 (due to centrifugal force, differential pressure, or combination thereof) to form the deliquored filter crystals 3a (removed liquid is referred to as a "deliquored liquid" 4a). Alternatively, the deliquoring is combined with such as high-speed-rotation-crystal-impact (ejection) grinding or crystal crushing to form the deliquored filter crystals 3a. The deliquored filter crystals 3a are filter crystals, or a mixture of filter crystals and deliquored liquid 4a.

The deliquoring efficiency may be low.

The deliquored liquid 4a is passed to a deliquored liquid tank 4.

The deliquored liquid 4a may be reused as the mother liquid 1a (to the crystal generator 2). Reuse of the deliquored liquid 4a may be of low running cost, low total cost and energy-saving system by supplying deliquored liquid 4a (as mother liquid 1a) to the mother-liquid tank 1, by reducing energy for cooling (or heating) mother liquid 1a, and by reducing the amount of disposal of the deliquored liquid 4a. When the mother liquid 1a is a multi-component liquid, the deliquored liquid 4a has a solute concentration different from the mother liquid 1a. In this case, the deliquored liquid 4a may be adjusted to the same solute concentrated as the mother liquid 1a.

The deliquored filter crystals 3a are introduced to the separator 6.

3) Separator 6

The separator 6 is an apparatus that separates a mixture to be separated (liquid-liquid, liquid-solid) by a crystal-filter layer 6a and a crystal-filter-layer-supporting wall having holes.

The crystal-filter-layer-supporting wall having holes is, for example, a basket-shaped-supporting wall or a drum-shaped-supporting wall, a filter cloth, and a screen.

The deliquored filter crystals 3a from the deliquoring machine 6 3 or the mother liquid crystals 2a from the crystal generator 2 are introduced to the separator 6, forming a filter layer (hereinafter the "crystal-filter layer" 6a) including the crystals as a filter medium in the separator. Natural snow may be introduced as the filter crystals to the separator. The deliquored filter crystals 3a, the mother liquid crystals 2a, or the filter crystals 100, which are introduced to the separator, may be accompanied by the liquid.

Next, the mixture 5a to be separated is supplied to a surface of the crystal-filter layer 6a (in which centrifugal force, differential pressure, or combination thereof is exerted in the separator 6).

The mixture 5a to be separated is separated into a passing liquid 7a which passes through the crystal-filter layer 6a and the crystal-filter-layer-supporting wall having holes, and a captured material captured in the crystal-filter layer.

When the mixture 5a to be separated is a liquid-liquid mixture, a low-viscosity liquid (such as an aqueous solution) in the mixture to be separated passes through the crystal-filter layer 6a and the crystal-filter-layer-supporting wall having holes, and discharged to the outside of the crystal-filter-layer-supporting wall, while a high-viscosity liquid 8b (such as oil) is captured in the crystal-filter layer.

On the other hand, when the mixture 5a to be separated is a liquid-solid mixture, a liquid in the mixture to be separated passes through the crystal-filter layer 6a and the crystal-filter-layer-supporting wall having holes, and discharged to the outside of the crystal-filter-layer-supporting wall, while solids 8c are captured in the crystal filter-layer 6a. Further, when a liquid in a liquid-solid mixture includes a liquid and an immiscible liquid like in the liquid-liquid mixture, the high-viscosity liquid 8b may be or not be captured in the crystal-filter layer according to applications of the present invention.

Further, for the purpose of separating multiple types of immiscible liquids in liquid-liquid or liquid-solid mixtures, the present invention may be used as a method and apparatus for separating a high-viscosity liquid and a low-viscosity liquid in immiscible liquids on the basis of the same principle (difference in viscosity between immiscible liquids) as in the liquid-liquid mixture.

Also, the present invention may be used as a separation (such as wintering) method and apparatus utilizing a difference in freezing point.

In addition, the mother liquid crystals 2a formed by the crystal generator 2 may be introduced to a deliquoring separator. The deliquoring separator continuously performs the operations of the deliquoring machine 3 and the separator 6 in a single apparatus. Through (a) a step of supplying mother liquid crystals, (b) a step of deliquoring the mother liquid crystals, (c) a step of supplying the mixture to be separated, and (d) a step of discharging the crystal-filter layer that has captured a high-viscosity liquid 8b and/or solids 8c, in the deliquoring separator, a low-viscosity liquid in the mixture 5a to be separated which is supplied in step (c) passes through the crystal-filter layer and the crystal-filter-layer-supporting wall having holes, while a high-viscosity liquid 8b and/or solids are captured in the crystal-filter layer.

In the present invention, before supplying the mixture 5a to be separated, the temperature of the mixture 5a to be separated may be decreased to produce a solidified matter (such as the same material as the filter crystals, or solidified oils) in the mixture 5a to be separated. An example of the present invention method where the solidified matter in the mixture 5a to be separated is the filter crystal is described with reference to a filter aid (below after "2. Details of apparatus, 2.2").

After the above-described operations, the liquid 7a passing through the crystal-filter layer 6a and the crystal-filter layer-supporting wall is introduced to a passing liquid tank 7. In addition, the crystal-filter layer 6a and the captured material are transferred introduced to an apparatus (such as melting tank 8) for melting the crystal-filter layer.

The captured material includes the high-viscosity liquid 8*b* and/or the solids 8*c* captured in the crystal-filter layer 6*a*. Hereinafter, the crystal-filter layer that has captured the captured material is referred to as a ICFL.

In addition, in the present invention, the same as the passing liquid 7*a* or components thereof may be captured in the ICFL 6*b* within a range in which the intended purpose of the system of the present invention can be achieved.

4) Melting of Crystal-Filter Layer

The crystal-filter layer in the ICFL is melted with an apparatus for melting the crystal-filter layer (hereinafter, a material melted the crystal-filter layer is referred to as a "melt". The melt may be contaminated with the captured material.). The melting is performed by heating (such as by using a heater or exploiting difference temperature between the inside and outside of a melting device).

During melting of the crystal-filter layer, the solids (such as solidified oil) in the ICFL may be or not melted according to the intended purpose of the system according to the present invention.

The separated melt 8*a* that is separated after melting may be used (reused) as the mother liquid 1*a* of the crystal generator 2. In this case, reuse of the melt 8*a* may be of low running cost, low total cost and energy-saving system by supplying the melt 8*a* (as the mother liquid 1*a*) to the mother-liquid tank 1, by reducing energy for cooling (or heating) the mother liquid 1*a*, and by reducing the amount of disposal of the melt 8*a*. Also, the reuse of the melt 8*a* has the possibility of decreasing the filter medium cost for changing the filter medium and/or the cost for treating (such as disposal) the filter medium after use as compared with conventional filtration.

2. Details of Apparatus

Details of the apparatuses constituting the system are described below.

1) Crystal Generator 2

The crystal generator 2 is an in-liquid or in-gas type apparatus. In the in-liquid type apparatus, crystals are generated (solidification of the mother liquid) using a cooled solid (such as metal) or a cooled fluid (gas and/or liquid) (made contact with the mother liquid) in the mother liquid, and the crystals are removed or scraped. In the in-gas apparatus, a mother liquid is mixed in a gas by low-temperature evaporation, heating evaporation, spraying, or liquid dropping, the resultant mixture is made contact with a cooled solid (such as metal) or a solid (such as plastic) to produce crystals (solidification of the mother liquid), and the crystals are removed or scraped.

Figure 3:
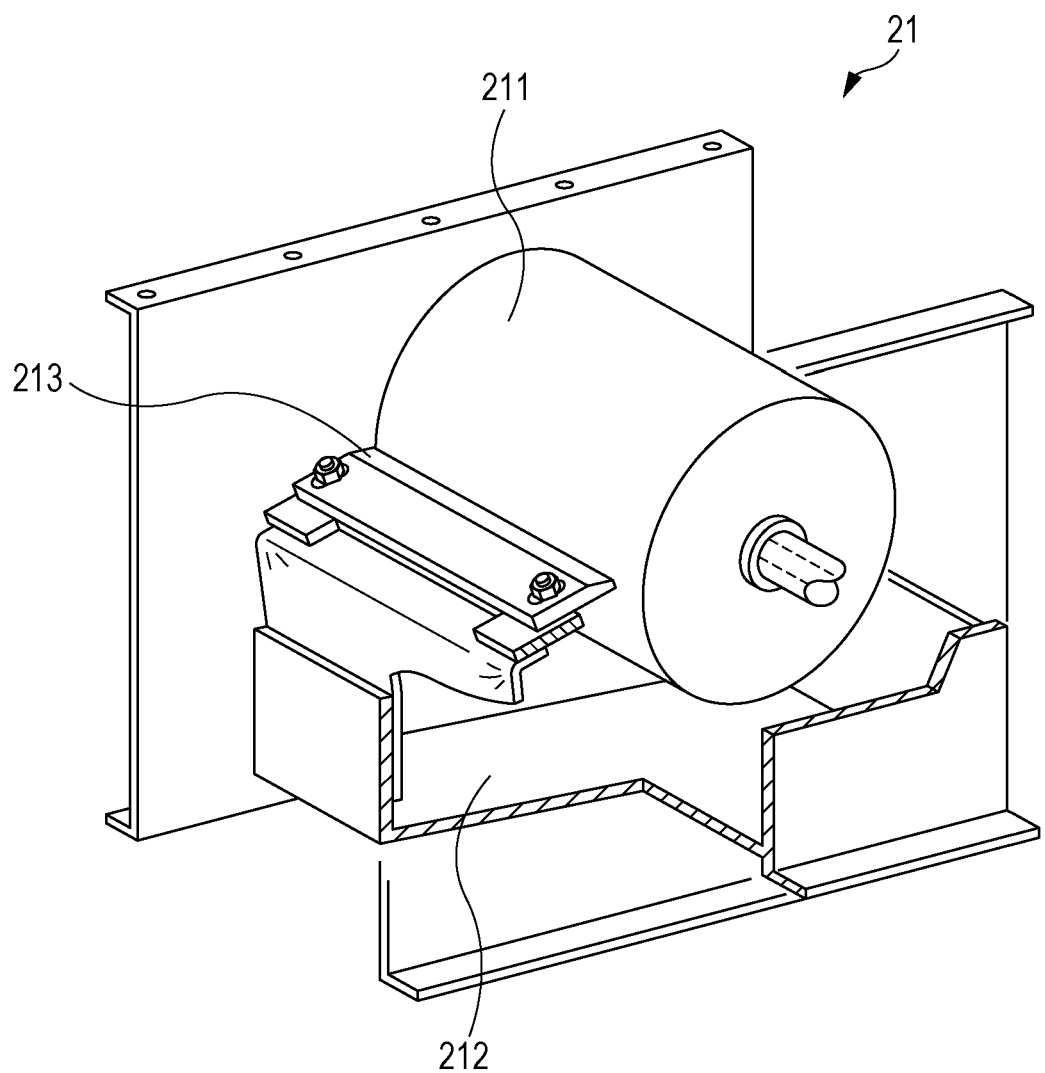
FIG. 3 is a schematic drawing of an in-liquid rotating drum-type crystal generator.

The in-liquid type apparatus for making crystals on the cooled solid includes types such as a rotating drum type 21 (FIG. 3), and an internally scraping drum type. Among these, the internally scraping drum type includes types such as an internally scraping heat exchanger type, an annular space scraping type, and an auger type. The general characteristics of these in-liquid type apparatuses are described in the documents below. The rotating drum type is described in U.S. Pat. No. 6,233,953 B1 and Toyohiko, O., Dechema-Monographien, BAND 47, pp. 815-821, 1962. The internally scraping heat exchanger type is described in the Thijssen document pp. 116, the annular space scraping type is described in Frytherm: Company Frymakoruma, Neuenburg. Germany, and the auger type is described in U.S. Pat. No. 4,497,184.

The cooled solid is generally cooled using a refrigerator. However, when the mother liquid is at high temperature, the cooled solid may be cooled by, for example, fan cooling, and water cooling without using a refrigerator. When the cooled solid is cooled with a refrigerator, a cooling medium may be either refrigerant or brine.

In the in-liquid type apparatus for producing crystals (solidification of the mother liquid) using the cooling fluid (gas and/or liquid), examples of the cooling gas include normal butane gas or iso-butane gas (Herbert, F., Advance in Chemistry Series, No. 27, pp. 82-89 1960), and examples of the cooling liquid include hydrofluoroether (inert-antifreezing liquid) (3M Co., USA).

The in-gas type apparatus includes types such as an evaporation type, a spraying type, and a dropping type, and methods thereof include a low-temperature evaporation method (Mitsuo, et al. Trans. of the JSRAE, Vol. 25, pp. 325-335 2008), a heating evaporation method, an ultrasonic method, a centrifugal method, a high-pressure spraying method, and a two-fluid spraying method. The term "low-temperature evaporation" represents that a liquid of 0° C. or more (boiling point or less) is made contact with a gas of 0° C. or less to mix vapor and/or fine droplets of the liquid in the gas.

Also, an apparatus of a type in which the mother liquid 1*a* is dispersed on a cooled surface to produce a solidified matter, which is then scraped, can be used as the crystal generator 2.

The crystal generator 2 may be a crushing-type apparatus in which mass or lump crystals (such as block ices) are crushed.

The mother liquid 1*a* may be continuously or discontinuously supplied in a necessary amount to the crystal generator 2 from the mother liquid tank 1. The temperature of the mother liquid in the mother liquid tank 1 may be controlled to a necessary temperature by, for example, a heater.

The shape and size of crystals produced by the crystal generator are adjusted by controlling the conditions such as the temperature and the moving velocity of the cooled solid (or the solid, or the cooled fluid), and the removal or scraping rate of crystals. Devices for removing or scraping crystals include devices such as a rotating brush, a scraper, a gas spray type device.

2) Deliquoring Machine 3, Separator 6, and Deliquoring Separator

Any one of the deliquoring machine 3, the separator 6, and the deliquoring separator can use methods and apparatuses using various filtration techniques (gravitation, pressure application, and pressure reduction) including centrifugal filtration (Perry document, pp. 19.65-19.103).

Among the various filtration techniques, a centrifugal method (Perry document, pp. 19.96-19.100) using a rotating basket as the crystal-filter-layer-supporting wall having holes and a drum filtration method (Perry document, pp. 19.79) using a rotating drum as the crystal-filter-layer-supporting wall having holes are described below.

The number of the holes of the crystal-filter-layer-supporting wall may be not many, and the hole shape on the wall may be long and narrow.

Figure 5:
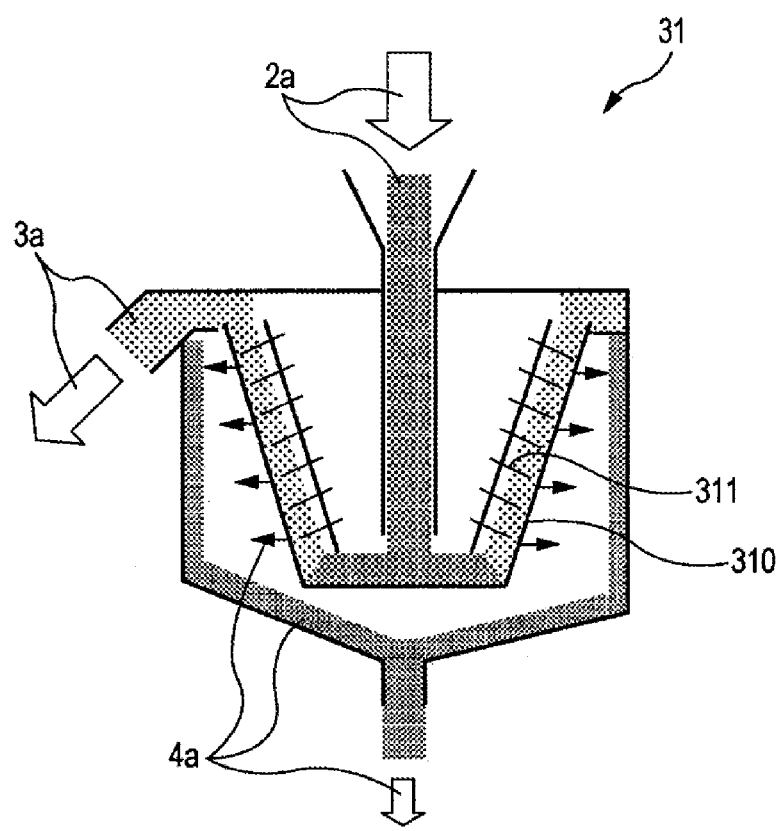
FIG. 5 is a schematic sectional view showing an operation of a conveyor-type deliquoring machine.

The centrifugal method uses a discontinuous or continuous apparatuses described below. Discontinuous types include types such as a filter-cloth-inverting type (FIG. 6), an automatic batch type, and a bottom discharge type, and continuous types include types such as a conveyor type 31 (FIG. 5), an extrusion type, and a conical basket type.

The general characteristics of these apparatuses are described in the documents below. The filter-cloth-inverting type (FIG. 6) is described in U.S. Pat. No. 7,168,571 B2. The automatic batch type, the bottom discharge type, the conveyor type 31 (FIG. 5), the extrusion type (pusher), and the conical basket type are described in Zeitsch K., Centrifugal Filtration, In Liquid-Solid Separation, 3rd ed., Butterworths, London, pp. 509-530 1990 and the Perry document, pp. 19.96-19.100. Further, "Dehydrator" (SAITO SEPARATOR LIMITED, Japan) is the conveyor type 31 (FIG. 5), and TANABE WILLTEC INC Japan has the extrusion type. In the conveyor type and the extrusion type, rotating baskets include a vertical type and a horizontal type, and the shapes of the baskets include a drum shape and a conical shape.

Figure 7:
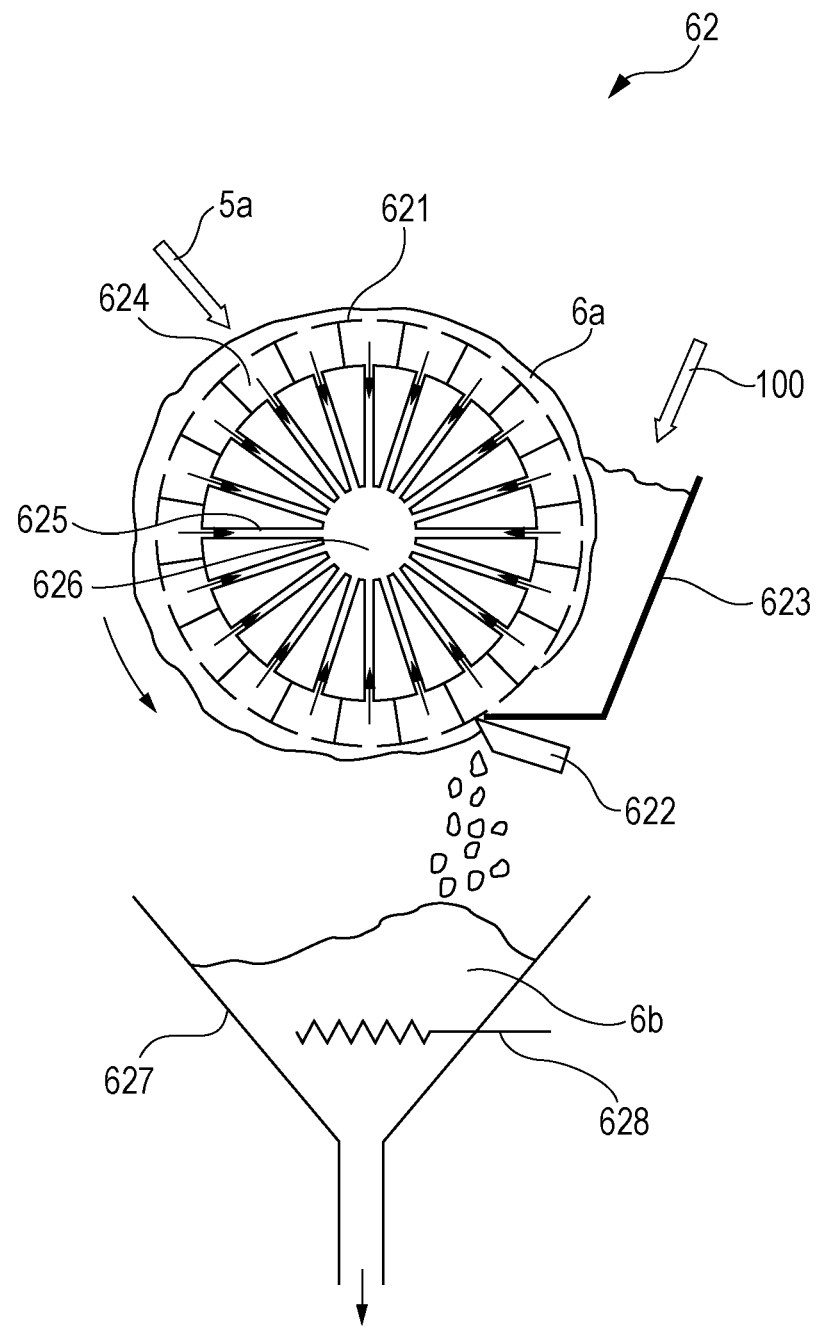
FIG. 7 is a schematic sectional view showing an operation of a drum filtration-type separator.

On the other hand, the drum filtration method includes a pressure method, a pressure reduction method (FIG. 7), and a combination thereof (Perry document pp. 19.65-19.89).

The drum filtration method by producing crystals in a liquid tank in which the drum is immersed can be used for the crystal generator, or for an apparatus serving as the crystal generator and the deliquoring machine, or for an apparatus serving as the crystal generator, the deliquoring machine and a separator. In this case, as means for generating the crystals in the liquid tank, a cooled surface for formed crystal and a scraping blade for scraped the crystal from the cooled surface are provided in the liquid tank, or a cooled gas or a cooed antifreezing liquid is introduced into the liquid tank.

2.1) Crystal-Filter-Layer-Supporting Wall Having Holes

When the crystal-filter-layer-supporting wall having holes is used in the separator 6 or the deliquoring separator, the average distance between the holes (between outer edges of the holes) of the supporting wall is preferably larger than the average thickness of the ICFL 6b. The thickness of the ICFL 6b is the distance between the surface of the ICFL 6b and the surface of the supporting wall having the hole. In this case, the total opening area of the holes of the supporting wall having holes is smaller than the surface area of the wall excluded the opening area of the holes of the wall.

Figure 8A:
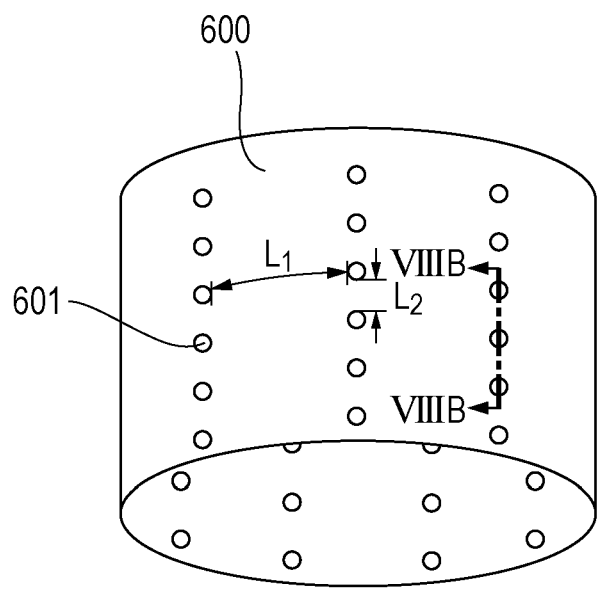
FIG. 8A is an arrangement of the holes in a surface of the supporting wall.
Figure 8B:
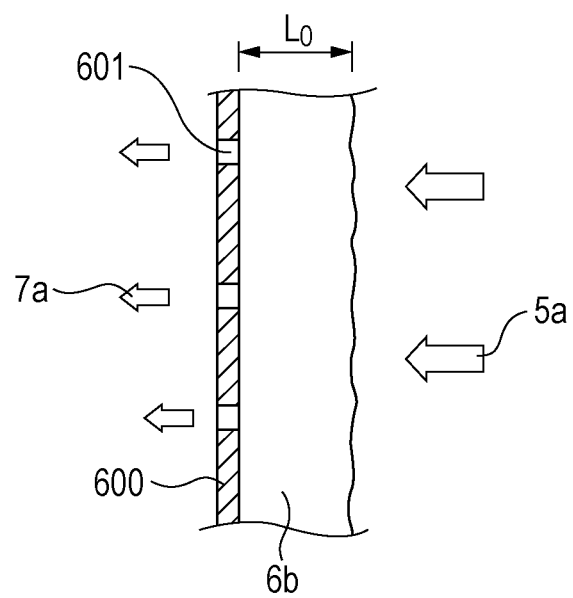
FIG. 8B is an enlarged sectional view of the supporting wall and a crystal-filter layer that has captured the material.

This is clearly explained with reference to FIG. 8. FIG. 8 shows an example of a relation between the ICFL and the crystal-filter-layer-supporting wall 600 having holes in the case of the basket-type-crystal-filter-layer-supporting wall 600 having holes. FIG. 8A shows an example of an arrangement of holes of the supporting wall surface. FIG. 8B is a sectional view of the supporting wall and the ICFL 6b when the mixture 5a to be separated is supplied to the crystal-filter layer using the supporting wall. In FIG. 8A, L1 and L2 each denote the distance between the holes 601 of the supporting wall surface. On the other hand, in FIG. 8B, L0 denotes the average thickness of the ICFL to which the mixture to be separated is being supplied. The above description means that the average distance $L12 (=(L1+L2)/2)$ between the holes 601 of the supporting wall surface is larger than $L0$ ($L12 > L0$).

The above conditions of the supporting wall having the holes causes the following phenomena:

1. The ratio of flow quantity and the flow distance of the mixture to be separated along the surface of the supporting wall, after flowing through the filter layer from the surface of the filter layer and reaching the surface of the supporting wall, are increased. This increases the average flow distance of the mixture to be separated (per unit volume) in the filter layer.

2. The crystal-filter medium is compressed to the supporting wall surface due to differential pressure (such as centrifugal force). Therefore the mixture to be separated at the above-described ratio of flow quantity (after reaching the supporting wall surface from the filter layer surface) is forced to be moved along the supporting wall surface through the compressed narrow gap between the supporting wall surface and the filter crystals, and also through the narrowed gaps between filter-crystals in the vicinity of the supporting wall surface.

These phenomena significantly increase the capture rate of material captured in the crystal-filter layer (=amount of material captured in crystal-filter layer/amount of crystal-filter layer/supply amount of mixture to be separated). This indicates that the amount of the crystal-filter medium can be decreased for a higher capture rate of the separator or the deliquoring separator. In addition, the phenomena have the possibility of enhancing the effect of coalescing immiscible droplets and/or fine solids in the mixture to be separated.

2.2) Others

The mother liquid crystals 2a, the deliquored filter crystals, or the filter crystals are preferably supplied to the deliquoring machine 3, the separator 6, and the deliquoring separator using a screw feeder or a tube conveyor.

In addition, the mixture 5a to be separated is preferably supplied to the crystal-filter layer in the separator or the deliquoring separator by spraying.

When the centrifugal method is applied to the deliquoring machine 3, the separator 6, and the deliquoring separator, a material such as a screen or a filter cloth, which rotates together with the basket, may be provided inside the basket. When the drum filtration method is applied to the deliquoring machine 3, the separator 6, and the deliquoring separator, a material such as a screen or a filter cloth or, which rotates together with a drum, may be provided outside the drum.

The shape and size of the deliquored filter crystals 3a produced by using the centrifugal method in the deliquoring machine are preferably controlled by selecting the conditions such as the amount of the mother liquid crystals 2a supplied, the discharge rate of the deliquored filter crystals, the rotational speed of the basket according to purposes of use of the system.

Besides the conditions of the crystal-filter-layer-supporting wall, the peration conditions of the separator and the deliquoring separator are preferably selected so as to increase the capture rates by the crystal-filter layer. The operation conditions include the supply amounts and supply rates of the mother liquid crystals 2a, the deliquored filter crystals, the filter crystals, and the mixture 5a to be separated, the differential pressure (such as centrifugal force) of the crystal-filter layer. When the separator or the deliquoring separator using the centrifugal method is used for separating the liquid-liquid mixture, the time required for one filtration is preferably short (several seconds or minutes) in order to increase the capture rate of the high-viscosity liquid capturing by the crystal-filter layer (to decrease the discharge of the high-viscosity liquid captured from the ICFL). The "time required for one filtration" represents the time required from supply of the mixture to be separated to the crystal-filter layer to discharge of the ICFL from the basket.

In the present invention, the filter crystals may be used as a filter aid in the separator 6 and the deliquoring separator (pre-coating method or body feed method) (Perry document, pp. 19.85).

3) Melting of Crystal-Filter Layer

After the above-described operations, the liquid 7a passing through the crystal-filter layer and the crystal-filter-layer-supporting wall is introduced to the passing liquid tank 7. The crystal-filter layer in the ICFL is melted using a melting device. The melting may be performed by the melting tank 8 or a system including the heater or the like provided in the course thereof without using the melting tank. Further, the melting may be performed in the separator. When the melting is performed in the separator, the melting may be accompanied with a gravity-settling separation (gravity separation due to a difference in specific gravity).

The mixture after melting (the melt, the high-viscosity liquid, and/or the solids) can be separated by separation means such as the gravity-settling-separation-method, a disk-type-centrifugal-separation method (Perry document, pp.

19.92-19.94), a tubular-centrifugal-separation method, a continuous-decanter-separation method (Perry document, pp. 19.94), and a method (and apparatus) using a membrane, a filter (Perry document, pp. 19.65-19.89), or a coalescer (Perry document, pp. 21.65-21.66).

When the melting tank 8 is used, the gravity-settling-separation method can be performed in the tank.

The melt 8a, the low-viscosity liquid, the high-viscosity liquid 8b, and the solids 8c separated by the above-described separation technique may be contaminated with material (or materials) contained in the mixture to be separated and/or in the melt (in amounts within a range in which the object of the preset invention can be achieved). In the whole description of this patent, even when the melt 8a, the low-viscosity liquid, the high-viscosity liquid 8b, and the solids 8c separated by the system of the present invention are contaminated with other material (or materials) (in amounts within a range in which the object of the preset invention can be achieved), the same expression (the melt 8a, the low-viscosity liquid, the high-viscosity liquid 8b, and the solids 8c) is used.

4) System

Each of the apparatuses and devices for the crystal generator 2, the deliquoring machine 3, the separator 6, the deliquoring separator, the crystal-filter-layer-melting device, and the device for separating the mixture after melting in "2. Details of Apparatus" can be used to make the combination for the system in the present invention.

Figure 9:
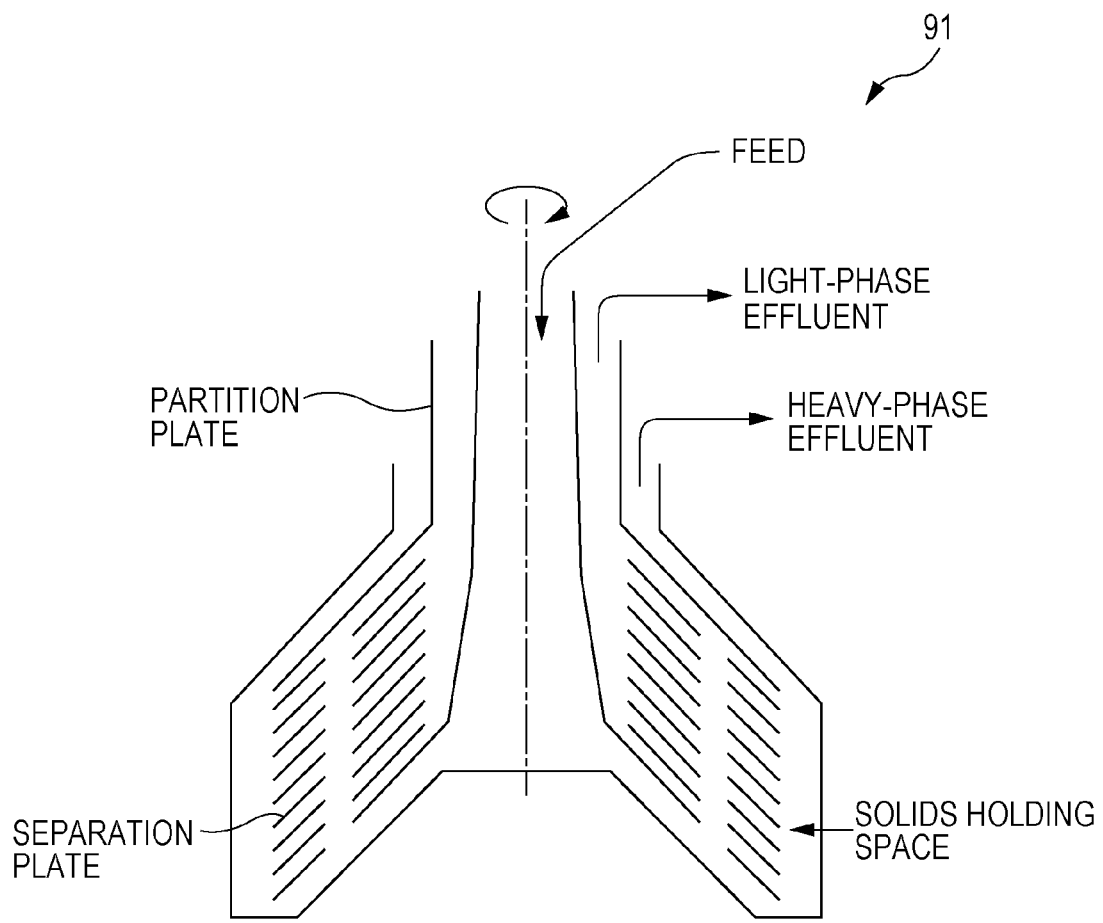
FIG. 9 is a schematic sectional view showing a disk-type centrifugal separator.

The combination may be used as pre-treatment means for the above-described various separation means such as the disk-type centrifugal separation method, the drum-type centrifugal separation method, the continuous decanter separation method, and a method and apparatus using a membrane, a filter, or a coalescer. For example, the disk-type-centrifugal-separation method may be used for increasing the purity of the captured material or the melt separated from the ICFL by the gravity-settling-separation method, or the purity of the passing liquid passing through the crystal-filter layer and the crystal-filter-layer-supporting wall. The disk-type-centrifugal-separation is a method that applies strong-centrifugal force, which is produced by a high-speed rotor (separation disk), to a mixture to be separated, thereby causing a difference in movement velocity between components in the mixture to be separated and resulting in separation of the components. Therefore, the separating ability is proportional to a difference in specific gravity between a dispersion medium and an immiscible liquid (and/or solids) in the mixture to be separated, and is reversely proportional to the viscosity of the dispersion medium. This technique is well known as a separation technique for liquid-liquid (light liquid and heavy liquid) or liquid-solid (solids and liquid or solids, light liquid, and heavy liquid). The structure and principle of the technique of disk-type-centrifugal-separation method (Disk-centrifuge) are described in, for example, the Perry document, pp. 19.89-19.103. FIG. 9 is a schematic sectional view showing an example of the disk-type centrifugal separator described in the document.

The system of the present invention may be a system for continuous treatment or batch treatment of the mixture 5a to be separated according to purposes of use. In addition, the system and the method may be various sizes according to purposes of use.

3. Preferred Modes of System

Preferred modes 1 and 2 of the system are described below.

1) Preferred Mode 1

Preferred mode 1 (FIGS. 1, 3, 5, and 6) relates to the system including the crystal generator 2, the deliquoring machine 3, the separator 6, and the melting tank 8. In the preferred mode 1, the crystal generator 2 is the in-liquid-rotating drum type 21 (FIG. 3), the deliquoring machine 3 is the centrifugal conveyor type (FIG. 5), the separator 6 is the centrifugal-filter-cloth-inverting type (FIG. 6), the crystal-filter layer is melted in the melting tank 8, and the mixture after melting (or during melting) is separated by the gravity settling separation method.

In addition, the mother liquid 1a is a NaCl solution (sterilized seawater), and the filter crystals are ice crystals. The mixture to be separated is a liquid-liquid mixture.

The mother liquid 1a is introduced from the mother liquid tank 1 to the in-liquid-rotating drum type crystal generator 21 (FIG. 3) described below.

In this mode, the rotating drum-type crystal generator 21 (FIG. 3) includes a rotating drum 211, a rotating drum mother liquid tank 212, and a rotating-drum-scraping blade 213. The mother liquid 1a is introduced from the mother liquid tank 1 to the rotating drum mother liquid tank 212. A refrigerant flows on the back of the outer surface of the rotating drum. When a lower part of the rotating drum 211 is immersed in the mother liquid 1a in the rotating drum mother liquid tank 212, crystals are produced on the outer surface of the drum, and thus the mother liquid crystals 2a are formed on the outer surface of the drum with rotation of the rotating drum 211. The mother liquid crystals 2a formed on the outer surface of the drum are continuously separated from the outer surface of the rotating drum with the rotating-drum-scraping blade 213 provided close to the outer surface of the drum. The mother liquid crystals 2a are a mixture of the crystals and the mother liquid.

The mother liquid crystals 2a formed by the crystal generator 2 are introduced to the conveyor-type-deliquoring device 31 (FIG. 5) disposed below the crystal generator 2. The mother liquid crystals 2a are a mixture of the crystals and the mother liquid.

In this mode, the conveyor-type-deliquoring device 31 operates as described below. In this case, a basket 310 having holes is a vertical type with a conical shape widening upward.

The mother liquid crystals 2a are introduced from the crystal generator 2 to the bottom of the rotating basket 310 having holes. The mother liquid crystals 2a that go into the bottom of the basket 310 receive centrifugal force of the rotating basket 310 having holes and diffuse on the inner wall of the basket 310. The diffused mother liquid crystals 2a are deliquored by rotation centrifugal force of the basket 310 while being moved upwardly on the inner wall of the rotating basket by a screw-shaped scraping blade 311 which rotates (at a differential rate from rotation of the basket) near the inner surface of the basket 310. The deliquored filter crystals 3a are discharged from the top edge of the basket. The discharged deliquored filter crystals 3a are introduced to a deliquored filter crystal tank disposed below the deliquoring machine 31. On the other hand, the deliquored liquid 4a is introduced to the deliquored liquid tank 4. The deliquored liquid 4a in the deliquored liquid tank 4 is introduced to the mother liquid tank 1 after adjustment of the concentration and is reused as the mother liquid 1a.

The deliquored filter crystals 3a in the deliquored filter crystal tank are introduced to the filter-cloth-inverting type separator (FIG. 6) by a screw feeder.

In this mode, the filter-cloth-inverting type separator operates as described below. The general characteristics of the filter-cloth-inverting type separator are described in U.S. Pat. No. 7,168,571 B2.

Figure 6A:
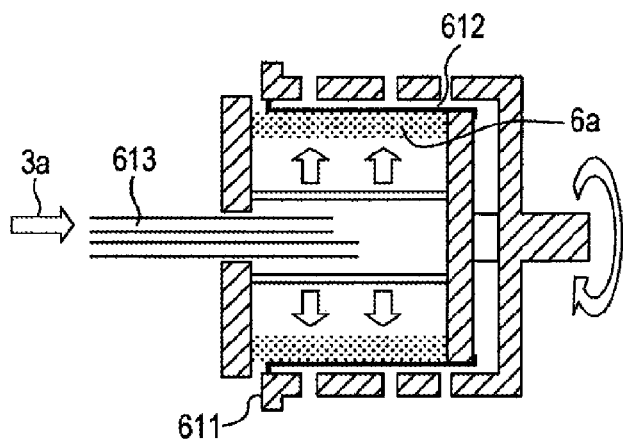
FIG. 6A shows an operation during supply of filter crystals.

(a) The deliquored filter crystals 3a in the deliquored filter crystal tank are introduced to a filter cloth 612 (the filter cloth rotates together with a basket 611) attached to the inner side of the rotating basket (crystal-filter-layer-supporting wall having holes) 611 by a screw feeder 613. The introduced deliquored filter crystals 3a form the crystal-filter layer 6a on the filter cloth (FIG. 6A).

Figure 6B:
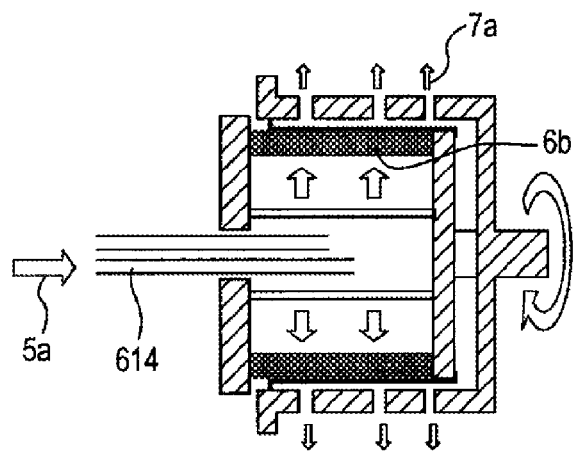
FIG. 6B shows an operation during supply of a mixture to be separated.

(b) The mixture 5a to be separates is sprayed on the surface of the formed rotating crystal-filter layer 6a through a supply pipe 614 for the mixture to be separated. A low-viscosity liquid in the sprayed mixture 5a to be separated passes through the crystal-filter layer and the crystal-filter-layer-supporting wall having holes, while the a high-viscosity liquid 8b is captured in the crystal-filter layer (FIG. 6B).

Figure 6C:
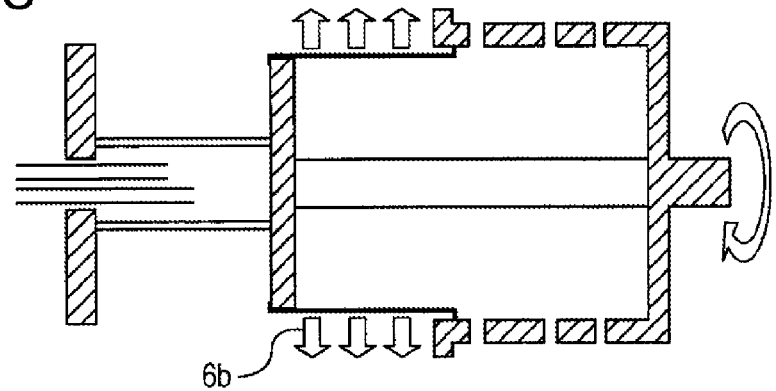
FIG. 6C shows an operation during discharge of a crystal-filter layer that has captured the material.

(c) The supply of the mixture 5a to be separated is stopped. Then, the ICFL 6b is separated from the filter cloth (due to centrifugal force) by inverting (turning inside out) the filter cloth 612. The separated ICFL 6b is discharged from the bottom of the separator (FIG. 6C).

After the above-described operations, the passing liquid 7a (low-viscosity liquid) passing through the crystal-filter layer and the crystal-filter-layer-supporting wall having holes is introduced to the passing liquid tank 7. The ICFL 6b is introduced to the melting tank 8. The crystal-filter layer is melted by heating (heater) in the melting tank 8. The mixture heated in the melting tank 8 is separated into the high-viscosity liquid 8b and the melt 8a due to a difference in specific gravity (gravity-settling separation).

2) Preferred Mode 2

Figure 4:
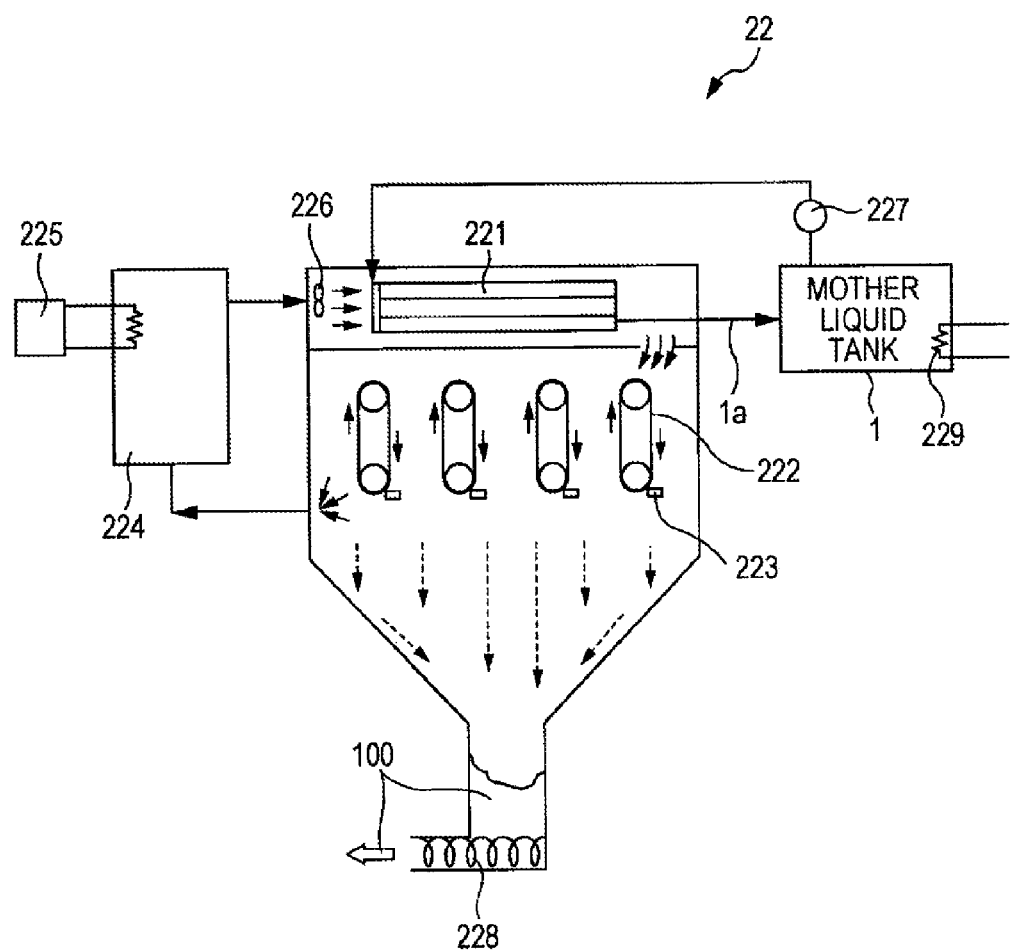
FIG. 4 is a schematic drawing of an in-gas low-temperature evaporation-type crystal generator.

Preferred mode 2 (FIGS. 2, 4, and 7) relates to the system including the crystal generator 2, the separator 6, and the melting tank 8. In the preferred mode 2, the crystal generator 2 is the in-gas low-temperature evaporation type 22 (FIG. 4), the separator 6 is the reduced-pressure drum filtration type 62 (FIG. 7), the crystal-filter layer is melted in the melting tank 8, and the mixture after melting (or during melting) is separated by the gravity settling separation method.

In addition, the mother liquid 1a is water, and the filter crystals are ice crystals. The mixture to be separated is a liquid/solid mixture.

The mother liquid 1a is introduced from the mother liquid tank 1 to the low-temperature evaporation-type crystal generator 22.

In this mode, the low-temperature evaporation-type crystal generator 22 includes a humidifier 221, a rotary ventilation filter 222, a crystal-scraping device 223, and a cooling room 224. The operations thereof are as follows.

A gas is cooled in the cooling room 224. The cooled gas is introduced into the humidifier 221 by a fan 226. The cooled gas introduced into the humidifier 221 is mixed with a mother liquid vapor evaporated (and/or fine droplets) from the mother liquid 1a at a temperature of 40° C. The cooled gas mixed with the mother liquid 1a is introduced into the rotary ventilation filter 222 on which crystals (solidification of the mother liquid 1a) are produced. The crystals formed on the ventilation filter 222 are removed with the crystal-scraping device 223 to make the filter crystals 100. The cooled gas (which may contain the unsolidified mother liquid) passed through the ventilation filter 222 is returned to the cooling room 224. The cooled gas (which may contain the unsolidified mother liquid) is circulated by the above-described step.

The rotary ventilation filter 222 is made of a gas-permeable material such as synthetic resin fibers. The cooling room 224 is provided with a cooler 225 and also provided with the function to control the temperature of cold gas (such as air) to the ventilation filter 222. The mother liquid 1a in the humidifier 221 is supplied from a mother liquid tank 1, and the mother liquid is controlled to a necessary temperature by a heater 229. The crystal-scraping device 223 is a scraper provided close to the ventilation filter 222.

The filter crystals 100 formed in the crystal generator 22 are introduced to a crystal reservoir 623 of the drum filtration-type separator 62 (FIG. 7) by a screw feeder 228.

In this mode, the drum filtration-type separator 62 (FIG. 7) is as follows: The drum filtration-type separator 62 (FIG. 7) includes a rotating drum, the crystal reservoir 623, and a drum-scraping blade 622. In addition, a plurality of small chambers 624 communicating with the holes of a surface material 621 of the drum are equipped on the back of the surface material of the rotating drum. Each of the small chambers 624 is connected to a central reduced-pressure chamber 626 through a pipe 625. The drum filtration-type separator operates as described below. The filter crystals 100 formed in the crystal generator 22 are introduced to the crystal reservoir 623 by the screw feeder 228. When the outer surface of the rotating drum passes through the crystal reservoir 623, then the filter crystals 100 are attracted to the outer surface of the drum due to a reduced pressure of holes of the surface material 621, thereby forming a crystal-filter layer 6a. The mixture 5a to be separated is sprayed on the crystal-filter layer 6a formed from the crystal reservoir 623 by rotation of the drum. A liquid in the sprayed mixture 5a to be separated passes through the crystal-filter layer 6a and the crystal-filter-layer-supporting wall 621 having holes due to the reduced pressure communicated through the holes of the drum, while solids 8c are captured in the crystal-filter layer. The ICFL 6b is separated, by rotation of the drum, from the outer surface of the drum with the drum scraping blade the drum-scraping blade 622 provided close to the outer surface of the drum. The separated ICFL 6b falls in a capturing crystal layer receiver 627. The crystal-filter layer in the ICFL 6b is melted with a heater 628 in the capturing crystal layer receiver 627. The melted mixture is passed to a gravity-settling separation tank disposed below the capturing crystal layer receiver 627 and is separated into the solids 8c and the melt 8a due to a difference in specific gravity in the gravity-settling separation tank. On the other hand, the liquid passing through the crystal-filter layer 6a and the crystal-filter-layer-supporting wall 621 having holes enters the small chambers 624 and then enters the central reduced-pressure chamber 626 from the small chambers 624 through the pipes 625, and is introduced into the passing liquid tank 7 outside the drum.

INDUSTRIAL APPLICABILITY

The present invention is suitable for a case in which ice is used as filter crystals, and natural materials (mixture of aqueous solution and oil or solids, or mixture of all of the above) is used as a mixture to be separated. Utilization of natural products is rapidly extending in the various fields such as energy, raw materials, medicines, and foods. However, relating techniques frequently have difficulty in separating natural products, and face high cost and/or low quality of products.

The invention claimed is:

1. A method for separating a mixture into a liquid and a material by using filter crystals, the method comprising the steps of:
   producing the filter crystals by cooling a mother liquid;
   providing the mixture including the liquid to be passed and the material to be captured, the material being immiscible and dispersed in the liquid;
   forming a crystal-filter layer of the filter crystals on the supporting wall of a rotating basket;
   supplying the mixture to the crystal-filter layer to allow the liquid to pass through the crystal-filter layer and the holes of the supporting wall, while capturing the material by the crystal-filter layer, thereby separating the liquid from the mixture, an average distance between the holes of the supporting wall being larger than an average thickness of the crystal-filter layer that has captured the material;

separating from the supporting wall the crystal-filter layer that has captured the material; and melting the filter crystals in the crystal-filter layer that has captured the material to allow the filter crystals and the captured material to separate.

\* \* \* \* \*